United States Patent [19]
Fricko

[11] 3,851,867
[45] Dec. 3, 1974

[54] PNEUMATIC ACTUATOR CONTROL APPARATUS

[75] Inventor: John J. Fricko, Harper Woods, Mich.

[73] Assignee: General Motors Corporation, Detroit, Mich.

[22] Filed: July 9, 1973

[21] Appl. No.: 377,226

[52] U.S. Cl.................. 267/120, 296/56, 188/300
[51] Int. Cl............................................ F16f 5/00
[58] Field of Search .......... 267/120, 121, 124, 114; 16/1 C; 49/386; 188/300; 296/56

[56] References Cited
UNITED STATES PATENTS

| | | | |
|---|---|---|---|
| 3,223,206 | 12/1965 | Bainbridge.......................... | 188/300 |
| 3,716,945 | 2/1973 | Cooper et al........................ | 296/56 |
| 3,744,844 | 7/1973 | Nomaki et al. ..................... | 188/300 |
| 3,762,514 | 10/1973 | Freitag............................... | 188/300 |

*Primary Examiner*—James B. Marbert
*Attorney, Agent, or Firm*—Saul Schwartz

[57] ABSTRACT

Control apparatus for a pneumatic actuator of the type having a cylinder tube portion, a piston slidably disposed in the cylinder tube portion and dividing the latter into a pair of chambers filled with a pressurized gas, a piston rod connected to the piston, a valve on the piston for opening and closing a passage between the chambers, and a control rod on the piston rod for moving the valve between open and closed positions, the control apparatus including a support member on the piston rod, an actuator pivotally supported on the support member and having a cam slot therein, and a follower pin rigidly attached to the control rod and slidably engaging the cam slot. When the actuator lever is pivoted the cam slot imparts bodily movement to the follower pin and hence to the control rod for opening and closing the valve and the pivot axis of the actuator lever is offset from the axis of the control rod so that a turning moment is developed on the actuator lever tending to maintain the latter in an unlocking position.

2 Claims, 7 Drawing Figures

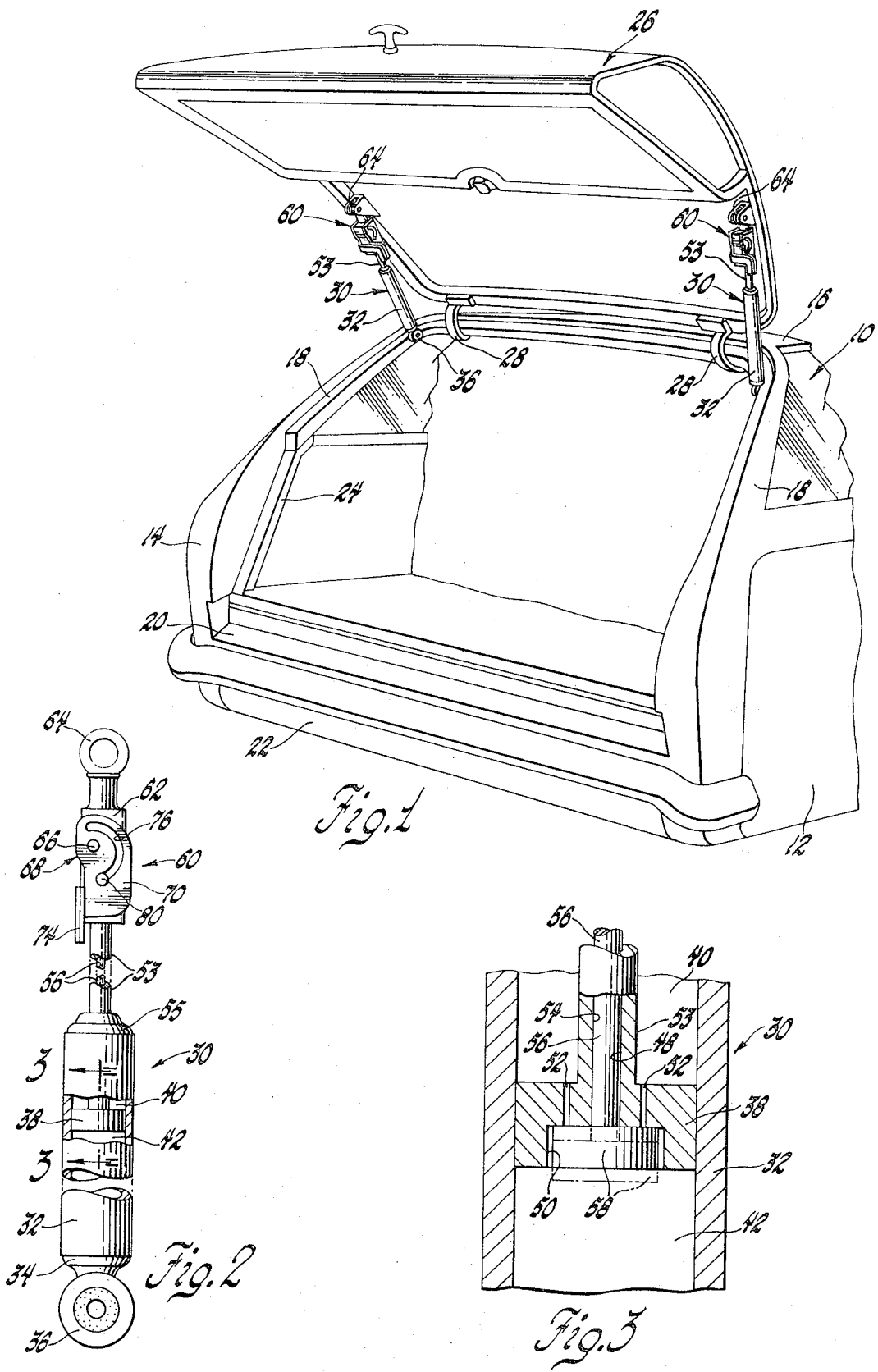

PNEUMATIC ACTUATOR CONTROL APPARATUS

This invention relates generally to pneumatic actuator assemblies and more particularly to improved control apparatus therefor.

Many automobile body structures include relatively large and heavy closures which are intended for manual manipulation between open and closed positions. To aid an operator in performing these manipulations, automotive engineers provide counterbalance arrangements which function to reduce the manual effort necessary to effect opening and closing movement. A particularly good structural example is a lift gate on a modern stationwagon type vehicle where the gate defines generally the entire rear wall of the body and is hinged to the body roof structure for pivotal movement to a raised, open position. For reasons of economy and simplicity, pneumatic actuators appear very attractive for counterbalancing such closures. Such pneumatic actuators normally include a cylinder tube pivotally attached to the body and filled with a pressurized gas, a piston rod pivotally attached to the closure and slidably projecting into the cylinder tube, a piston in the cylinder tube connected to the end of the piston rod, and a valve system in the piston and the piston rod adapted to open and close a passage across the piston. The gas acting on the unbalanced area of the piston rod normally urges the latter out of the cylinder tube when the piston passage is open to counterbalance the weight of the closure. When the passage is closed, however, the gas is trapped in the chambers on the opposite sides of the piston so that further movement of the piston rod is foreclosed except in a springing mode. A pneumatic actuator assembly according to this invention incorporates an improved control apparatus which permits the actuator to be easily and positively locked in any position or continuously released for counterbalancing operation, the assembly being particularly attractive for vehicle closure installations.

Accordingly, the primary feature of this invention is that it provides an improved pneumatic actuator assembly of the type including a cylinder tube, a piston and piston rod unit, and a valve control rod in the piston rod actuateable from exteriorly of the assembly for controlling a valve on the piston. Another feature of this invention is that it provides an improved pneumatic actuator assembly of the type described including a control lever pivotally disposed on the piston rod and engageable on the control rod for actuating the latter and a locking arrangement for positively maintaining the lever in a position corresponding to the open position of the valve. Still another feature of this invention resides in the provision in the control apparatus of a cam slot on the actuator lever engageable by a follower pin on the control rod, the cam slot raising and lowering the pin and rod in response to pivotal movement of the control lever. A still further feature of this invention resides in the placement of the control lever pivot axis relative to the longitudinal axis of the control rod, the pivot axis being offset from the control rod axis so that in the open position of the valve the control rod exerts a force on the control lever tending to maintain or lock the control lever in the position corresponding to the open position of the valve.

These and other features of this invention will be readily apparent from the following specification and from the drawings wherein:

FIG. 1 is a perspective view of the rearward portion of a vehicle body incorporating a pneumatic actuator assembly according to this invention;

FIG. 2 is an enlarged partially broken-away view of a portion of FIG. 1 showing a pneumatic actuator assembly according to this invention;

FIG. 3 is an enlarged sectional view taken generally along the plane indicated by lines 3—3 in FIG. 2;

Figure 4:
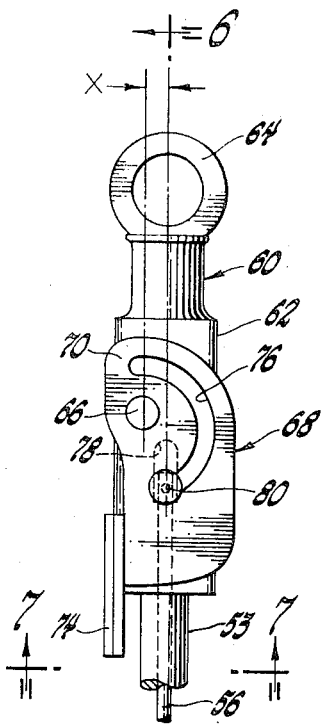
FIG. 4 is an enlarged view of a portion of FIG. 2 showing the actuator control apparatus in an unlocked condition.

Referring now to the drawings, FIG. 1 depicts the rearward portion of a stationwagon type vehicle body, designated generally 10, including a right quarter panel structure 12, a left quarter panel structure 14 and a roof structure 16. The roof structure is connected to the quarter panel structures through a pair of body pillars 18 while the lower ends of the quarter panel structures are interconnected by a transverse sill assembly 20, the sill assembly being protected by a bumper bar 22 disposed on the vehicle body in a conventional manner. The roof structure, the sill assembly, the quarter panel structures, and the body pillars cooperate in defining a generally rectangular rear body opening 24 through which access may be had to the interior in the body. A closure or tailgate assembly 26 is supported on the roof structure by a pair of hinges 28 for pivotal movement about a transverse axis of the vehicle body between a closed position, not shown, disposed within the rear body opening 24 and an open position, FIG. 1, disposed generally above the opening 24. The closure 26 is adapted for manual manipulation between the closed and open positions, the weight of the closure being counterbalanced for easy operation by a pair of pneumatic actuator assemblies 30 at least one of which is constructed according to this invention.

Referring now to FIGS. 1, 2 and 3 and describing only one of the actuator assemblies 30, the latter includes a cylinder tube portion 32 closed at one end by a cap 34 having attached thereto a mounting eye 36. A piston 38 is slidably disposed in the cylinder tube 32 and divides the interior of the latter into a pair of variable volume chambers 40 and 42. The piston 38 includes a bore 48 opening into a counterbore 50 and a pair of throttling bores 52 extending between one side of the piston and the counterbore 50.

A piston rod 53 having an axial bore 54 is rigidly attached to the piston 38 by conventional means, as by welding, with axial bore 54 aligned with bore 48 in the piston. The piston rod 53 extends out of the cylinder tube portion 32 through a seal 55 which sealingly closes the upper end of the variable volume chamber 40. The piston rod, of course, is slidable in the seal 55 so that movement of the rod effects corresponding movement of the piston within the cylinder tube portion and vice versa. A control rod 56 is slidably disposed in the axial bore 54 of the piston rod and extends into the counterbore 50 in the piston 38 wherein a valve element 58 is disposed. The control rod is rigidly attached to the valve element by conventional means so that reciprocation of the rod within the bore 54 effects bodily movement of the valve element between a closed position and an open position, shown respectively in solid and broken lines in FIG. 3. A clearance is provided between the walls of the counterbore 50 and the valve element 58 so that in the open position of the latter a passage is defined between the chambers 40 and 42 through the throttling bores 52 and around the valve element. Conversely, in the closed position of the valve element, the throttling bores 52 are blocked by the valve element so that the chambers 40 and 42 are isolated.

The chambers 40 and 42 are filled with a pressurized gaseous medium, as for example an inert gas such as nitrogen. The pressure of the gaseous medium acts on both sides of the piston 38 but on only one end of the piston rod 53 and the control rod 56 so that in the open position of the valve element the valve element is urged toward the closed position and the piston rod is urged out of the cylinder tube portion. When the valve element 58 is in the closed position, however, flow of the gaseous medium between the chambers 40 and 42 is foreclosed so that the piston 38 and hence the piston rod are effectively locked in the positions occupied when the valve elements achieved the closed position.

Referring particularly now to FIGS. 2 through 7, a control apparatus according to this invention and designated generally 60 is disposed on the distal end of the piston rod 53 and is adapted for controlling the position of the valve element 58. The control apparatus includes an elongated, generally rectangular support member 62 threadedly received on the end of the piston rod 53. A second mounting eye 64 is rigidly attached to the support member 62 by conventional means, as by welding. A pin 66 projects rigidly from opposite sides of the support member 62 and defines an axis of the latter. A generally U-shaped actuator lever 68 including a pair flanges 70 and an integral web 72 embraces the support member 62 and is supported thereon by the pin 66 for pivotal movement about the axis defined by the latter between a locking position, FIG. 5, and an unlocking position, FIGS. 4 and 6. A finger tab 74 integral with the web 72 and one flange 70 of the actuator lever is offset from the main portion of the latter and is intended for manual actuation as described hereinafter.

Figure 5:
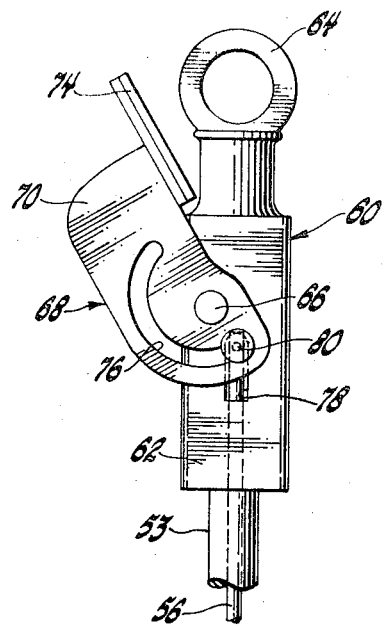
FIG. 5 is similar to FIG. 4 but showing the control apparatus in a locked condition.
Figure 6:
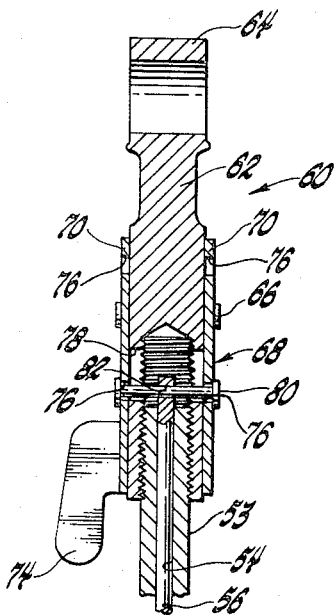
FIG. 6 is a sectional view taken generally along the plane indicated by lines 6—6 in FIG. 4.
Figure 7:
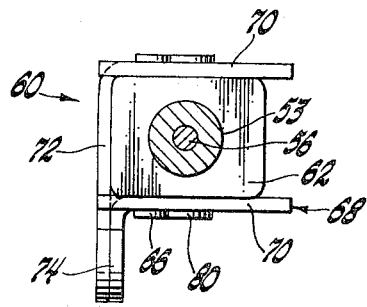
FIG. 7 is a view taken generally along the plane indicated by lines 7—7 in FIG. 4.

As seen best in FIGS. 4, 5 and 6, each flange 70 of the actuator lever 68 includes a curvilinear cam slot 76, the slots on each flange being in registry and intersecting a generally vertically disposed slot 78 extending through the support member 62 between the flanges. A cam follower pin 80 extends through the slot 78 in the support member and is slidably received in each of the cam slots 76 on the lever 68 so that when the lever is pivoted about the axis defined by the pin 66, the curvature of the slot causes the follower pin to move vertically between a position adjacent the lower end of the slot 78, FIGS. 4 and 6, when the lever is in the unlocking position and adjacent the top of the slot 78, FIG. 5, when the lever is in the locking position.

As seen best in FIG. 6, the control rod 56 projects above the distal end of the piston rod 53 and intersects the follower pin 80, the control rod being provided with an aperture 82 for receiving therethrough the pin 80. Accordingly, as the follower pin is shifted vertically between the ends of the slot 78 the control rod 56 is likewise shifted vertically relative to the piston rod 53 since the support member 62 is rigidly attached to the piston rod.

Describing now a typical operational sequence of the pneumatic actuator assembly, the latter is disposed between the closure 26 and the body 10 with the eye 36 being suitably pivotally supported on the pillar 18 and the eye 64 being similarly pivotally supported on the closure 26. When the closure is latched in the closed position, not shown, the piston 38 is disposed generally adjacent the cap 34, the pressure of the gas within the cylinder tube portion tending to urge the piston rod out of the cylinder tube portion but being resisted by the closure latch. The actuator 68 is normally in the unlocking position thereof, FIGS. 4 and 6, so that the chambers 40 and 42 are maintained in continuous communication. Accordingly, when the latch holding the closure in the closed position is released, the pressure of the gas exerted on the differential area of the piston rod projects the latter out of the cylinder tube portion thereby to pivot the closure 26 to the open position, FIG. 1. Similarly, with the valve again in the open position, light manual pressure exerted on the closure 26 projects the piston rod into the cylinder tube portion thereby telescopically collapsing the pneumatic actuator assembly until the closure is again latched in the closed position.

When it is desired to maintain the closure 26 in any position between the open and closed positions it is necessary only to pivot the actuator lever 68 from the unlocking position, FIG. 4, to the locking position, FIG. 5. Such movement of the lever effects vertical movement of the follower pin 80 and the control rod 56, the latter moving the valve element 58 from the open to the closed position thereof. With the valve element in the closed position, communication between the chambers 40 and 42 is severed so that the piston is effectively locked in the desired position. To unlock the piston, of course, it is necessary only to return the actuator lever 68 to the unlocking position, FIGS. 4 and 6.

It will be apparent to those skilled in the art that the control rod 56 embodies a differential area acted upon by the pressure of the gaseous medium within the cylinder tube portion 32. The gas pressure urges the control rod toward the position thereof corresponding to the closed position of the valve element 58. Since the actuator lever 68 is normally in the unlocking position so that the closure 26 will automatically move to the open position when unlatched, the actuator assembly according to this invention incorporates a provision for maintaining the actuator lever in the unlocking position. More particularly, as best seen in FIG. 4, the axis defined by the pin 66 is offset by a distance X from the longitudinal axis of the control rod 56. The follower pin 80, of course, engages the actuator lever 68 in the plane of the longitudinal axis of the control rod so that the force exerted on the lever by the gas in the cylinder tube portion 32 through the control rod and the follower pin is directed to the right of the axis defined by the pin 66, FIG. 4. Accordingly, a counterclockwise turning moment is developed on the actuator lever about the pin 66 which tends, of course, to pivot the actuator lever toward the unlocking position. Therefore, once the lever is manually positioned in the unlocking position, the force exerted by the follower pin 80 thereon maintains the lever in the unlocking position for continuous normal operation.

Having thus described the invention, what is claimed is:

1. In a pneumatic actuator assembly for effecting relative movement between a pair of structural elements, said actuator assembly being of the type including a cylinder tube portion disposed on one of said structural elements, a piston slidably disposed in said cylinder tube portion and dividing the latter into a pair of chambers, a piston rod slidably disposed on said cylinder tube portion and operatively connected to said piston, means on said piston defining a passage between said pair of chambers, a valve disposed on said piston for movement between an open position and a closed position blocking said passage, a control rod operatively connected to said valve and disposed on said piston rod for reciprocation between an extended position and a retracted position corresponding respectively to the open and the closed position of said valve, and a pressurized gaseous medium in said chambers for effecting movement of said piston rod in the open position of said valve, the improvement comprising, a support member disposed between said piston rod and the other of said pair of structural elements so that movement of said piston rod relative to said cylinder tube portion effects relative movement between said pair of structural elements, an actuator lever disposed on said support member for rotation about an axis of said support member between a locking position and an unlocking position, means on said actuator lever defining a cam slot, a cam follower, means rigidly attaching said cam follower to said control rod, said cam follower engaging said cam slot so that movement of said actuator lever from the locking to the unlocking position effects concurrent movement of said control rod from the retracted to the extended position, and means associated with said actuator lever for maintaining the latter in the unlocking position thereof.

2., In a pneumatic actuator assembly for effecting relative movement between a pair of structural elements, said actuator assembly being of the type including a cylinder tube portion disposed on one of said structural elements, a piston slidably disposed in said cylinder tube portion and dividing the latter into a pair of chambers, a piston rod slidably disposed on said cylinder tube portion and operatively connected to said piston, means on said piston defining a passage between said pair of chambers, a valve disposed on said piston for movement between an open position and a closed position blocking said passage, a control rod operatively connected to said valve and disposed on said piston rod for reciprocation between an extended position and a retracted position corresponding respectively to the open and the closed positions of said valve, and a pressurized gaseous medium in said chambers for effecting movement of said piston rod in the open position of said valve, the improvement comprising, a support member disposed between said piston rod and the other of said pair of structural elements so that movement of said piston rod relative to said cylinder tube portion effects relative movement between said pair of structural elements, means on said support member defining a pivot axis disposed generally perpendicularly with respect to the longitudinal axis of said control rod and spaced laterally from said longitudinal axis, an actuator lever including a side portion having a cam slot therein, means supporting said actuator lever on said support member for rotation about said pivot axis between a locking position and an unlocking position, and a cam follower pin rigidly attached to said control rod and oriented generally perpendicularly with respect to said longitudinal axis, said cam follower pin slidably engaging said cam slot in the plane of said longitudinal axis so that movement of said actuator lever from the locking to the unlocking position effects concurrent movement of said control rod from the retracted to the extended position, said control rod in the extended position thereof exerting a force on said actuator lever through said follower pin and said cam slot urging rotation of said actuator lever toward the unlocking position thereof thereby to maintain said actuator lever in the unlocking position.

* * * * *